US012786029B2

(12) United States Patent
Alizadeh et al.

(10) Patent No.: US 12,786,029 B2
(45) **Date of Patent: *Nov. 3, 2026**

(54) MULTI-BAND POWER AMPLIFIER FOR NON-SIMULTANEOUS TRANSMIT AND RECEIVE (NSTR) MULTI-LINK DEVICES

(71) Applicant: Cisco Technology, Inc., San Jose, CA (US)

(72) Inventors: Ardalan Alizadeh, Milpitas, CA (US); Sivadeep Reddy Kalavakuru, Akron, OH (US); Matthew Aaron Silverman, Shaker Heights, OH (US); Mohsen Jamalabdollahi, Akron, OH (US); Fred Jay Anderson, Lakeville, OH (US)

(73) Assignee: Cisco Technology, Inc., San Jose, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/920,576

(22) Filed: Oct. 18, 2024

(65) Prior Publication Data

US 2025/0055745 A1 Feb. 13, 2025

Related U.S. Application Data

(63) Continuation of application No. 18/171,702, filed on Feb. 21, 2023, now Pat. No. 12,126,480.

(51) Int. Cl.
*H04L 27/26* (2006.01)
*H04B 1/04* (2006.01)

(52) U.S. Cl.
CPC ....... *H04L 27/2623* (2013.01); *H04B 1/0475* (2013.01); *H04B 2001/0408* (2013.01)

(58) Field of Classification Search
CPC .............. H04L 27/2623; H04B 1/0475; H04B 2001/0408; H04B 2001/0425
See application file for complete search history.

(56) References Cited

U.S. PATENT DOCUMENTS

2013/0163512 A1* 6/2013 Rexberg .............. H04L 27/2624 370/328
2013/0329819 A1 12/2013 Gu
(Continued)

FOREIGN PATENT DOCUMENTS

WO 2022007870 A1 1/2022
WO 2022016005 A1 1/2022
WO 2022108838 A1 5/2022

*Primary Examiner* — Vineeta S Panwalkar
(74) *Attorney, Agent, or Firm* — Merchant & Gould P.C.

(57) ABSTRACT

Crest Factor Reduction (CFR) parameters are determined for a dual band Power Amplifier (PA). A first band of the dual band PA is associated with a first Multi-Link Operation (MLO) link and a second band of the dual band PA is associated with a second MLO link. Determining the CFR parameters comprises determining based on a configuration of the first MLO link and the second MLO link. A first portion of the CFR parameters is provided to a first crest factor reduction block. First portion of the CFR parameters comprises a first clipping threshold associated with the first band and first filter coefficients associated with the first band. A second portion of the CFR parameters is provided to a second crest factor reduction block. The second portion of the CFR parameters comprises a second clipping threshold associated with the second band and second filter coefficients associated with the second band.

3 Claims, 6 Drawing Sheets

(56) References Cited

U.S. PATENT DOCUMENTS

| | | | | |
|---|---|---|---|---|
| 2014/0347126 | A1* | 11/2014 | Laporte | H03F 1/34 330/149 |
| 2014/0362950 | A1* | 12/2014 | Fehri | H04B 1/68 375/296 |
| 2021/0119657 | A1 | 4/2021 | Haza et al. | |
| 2021/0160941 | A1 | 5/2021 | Patil et al. | |
| 2021/0282186 | A1 | 9/2021 | Cherian et al. | |

* cited by examiner

D, M and Rx/Tx Represent a RxPHYDelay, a MACProcessingDelay, and aRxTxTurnaroundTime(Assuming 4μs), respectively.

MULTI-BAND POWER AMPLIFIER FOR NON-SIMULTANEOUS TRANSMIT AND RECEIVE (NSTR) MULTI-LINK DEVICES

RELATED APPLICATION

This application is a continuation of U.S. patent application Ser. No. 18/171,702 filed Feb. 21, 2023, the disclosure of which is incorporated herein by reference in its entirety.

TECHNICAL FIELD

The present disclosure relates generally to providing a multi-band power amplifier for Non-Simultaneous Transmit and Receive (NSTR) multi-link devices.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
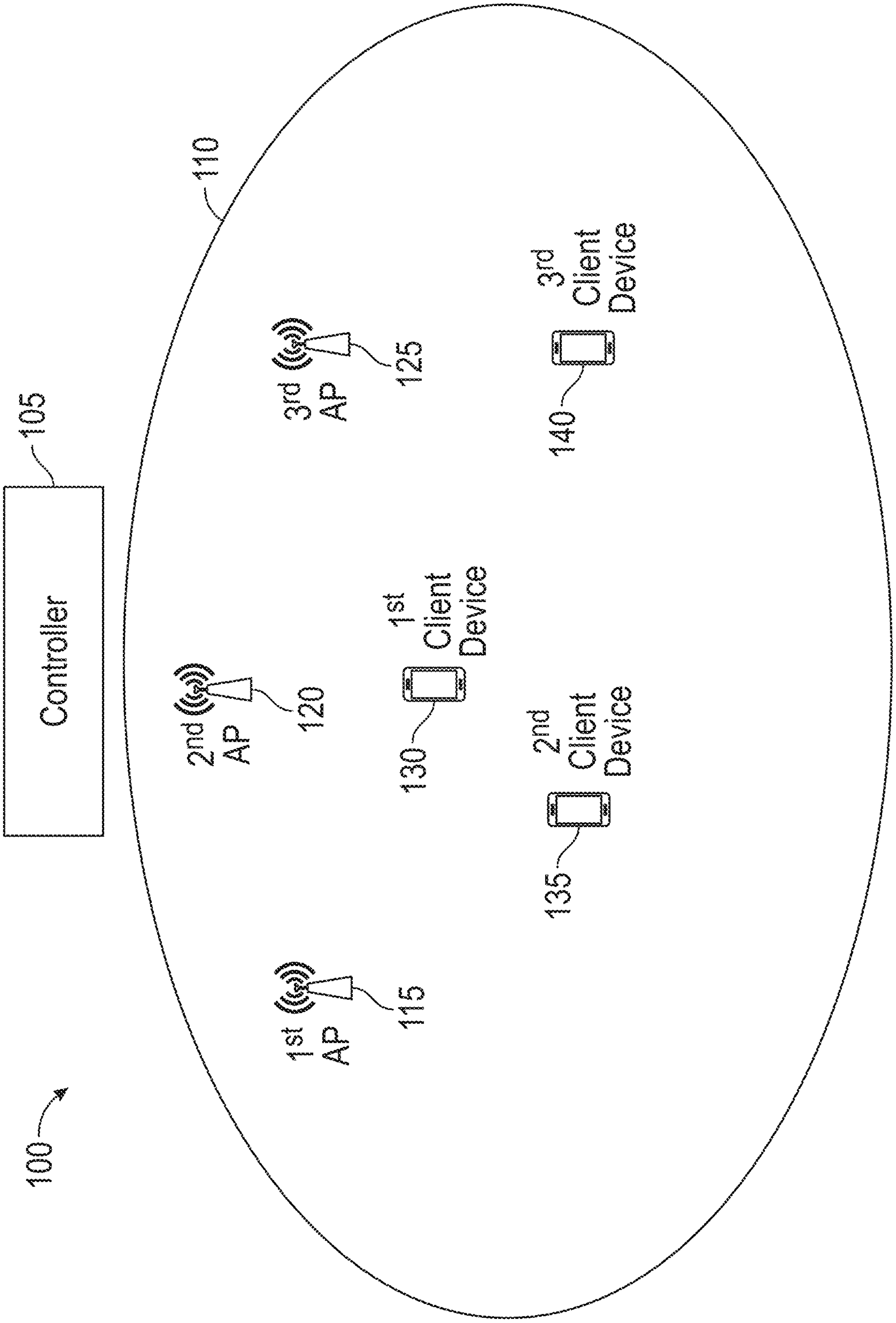
FIG. 1 is a block diagram of an operating environment for providing a multi-band power amplifier for Non-Simultaneous Transmit and Receive (NSTR) multi-link devices.

A multi-band power amplifier for Non-Simultaneous Transmit and Receive (NSTR) multi-link devices may be provided. Crest Factor Reduction (CFR) parameters may be determined for a dual band Power Amplifier (PA). A first band of the dual band PA may be associated with a first Multi-Link Operation (MLO) link and a second band of the dual band PA may be associated with a second MLO link. Determining the CFR parameters may comprise determining the CFR parameters based on a configuration of the first MLO link and the second MLO link. A first portion of the CFR parameters may be provided to a first crest factor reduction block. The first portion of the CFR parameters may comprise a first clipping threshold associated with the first band and first filter coefficients associated with the first band. A second portion of the CFR parameters may be provided to a second crest factor reduction block. The second portion of the CFR parameters may comprise a second clipping threshold associated with the second band and second filter coefficients associated with the second band.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

With the development of new features in Wi-Fi7, the Radio Frequency (RF) front-end design of APs may be improved. Specifically, Multi-Link Operation (MLO) devices may have several modes of operations that may be linked to capabilities of a Radio Frequency Integrated Circuit (RFIC).

Conventional Front End Modules (FEM) of APs may comprise one Power Amplifier (PA) per radio where each PA may work independently. With such a design for supporting multi-link operation, one PA per link may be used. Although the initial deployments of MLO may be the simplest case of having a single two-link MLO, in the future APs may support multiple radios, each supporting more than two links.

Having too many PAs in an AP may not only be cost-inefficient, but also it may impose amounts of heat to an AP that may be harmful for its internal modules (e.g., Central Processing Unit (CPU)). Moreover, the power draw of PAs may jeopardize the maximum power of Power-over-Ethernet (POE).

Dual-band RF PAs for sub-6 GHz Wi-Fi may support carrier aggregation in 5G. Considering such a PA for supporting multi-links of Wi-Fi 7 may be a solution to the above problem. Embodiments of the disclosure may provide Wi-Fi-specific processes to improve the PA efficiency by optimizing the Peak-to-Average Power Ratio (PAPR). Accordingly, embodiments of the disclosure may provide a transmit RF chain for Wi-Fi7 multi-link devices based on a dual-band RF power amplifier. By leveraging the multi-band PA capability for multi-link operation, embodiments of the disclosure may improve radio efficiency and may also reduce the FEM complexity. MLO-specific PAPR reduction processes and an enhancement in Digital Pre-Distortion (DPD) may be provided.

FIG. 1 shows an operating environment 100 for providing a multi-band power amplifier for NSTR multi-link devices. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11 specification standard for example.

The plurality of APs and the plurality of client devices may use Multi Link Operation (MLO) where they simultaneously transmit and receive across different bands and channels by establishing two or more links to two or more AP radios. These bands may comprise, but are not limited the 2 GHz band, the 5 GHz band, the 6 GHz band, and the 60 GHz band.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide a multi-band power amplifier for NSTR multi-link devices.

The elements described above of operating environment 100 (e.g., controller 105, first AP 115, second AP 120, third AP 125, first client device 130, second client device 135, or third client device 140) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 100 may be practiced in a computing device 600.

Figure 2:
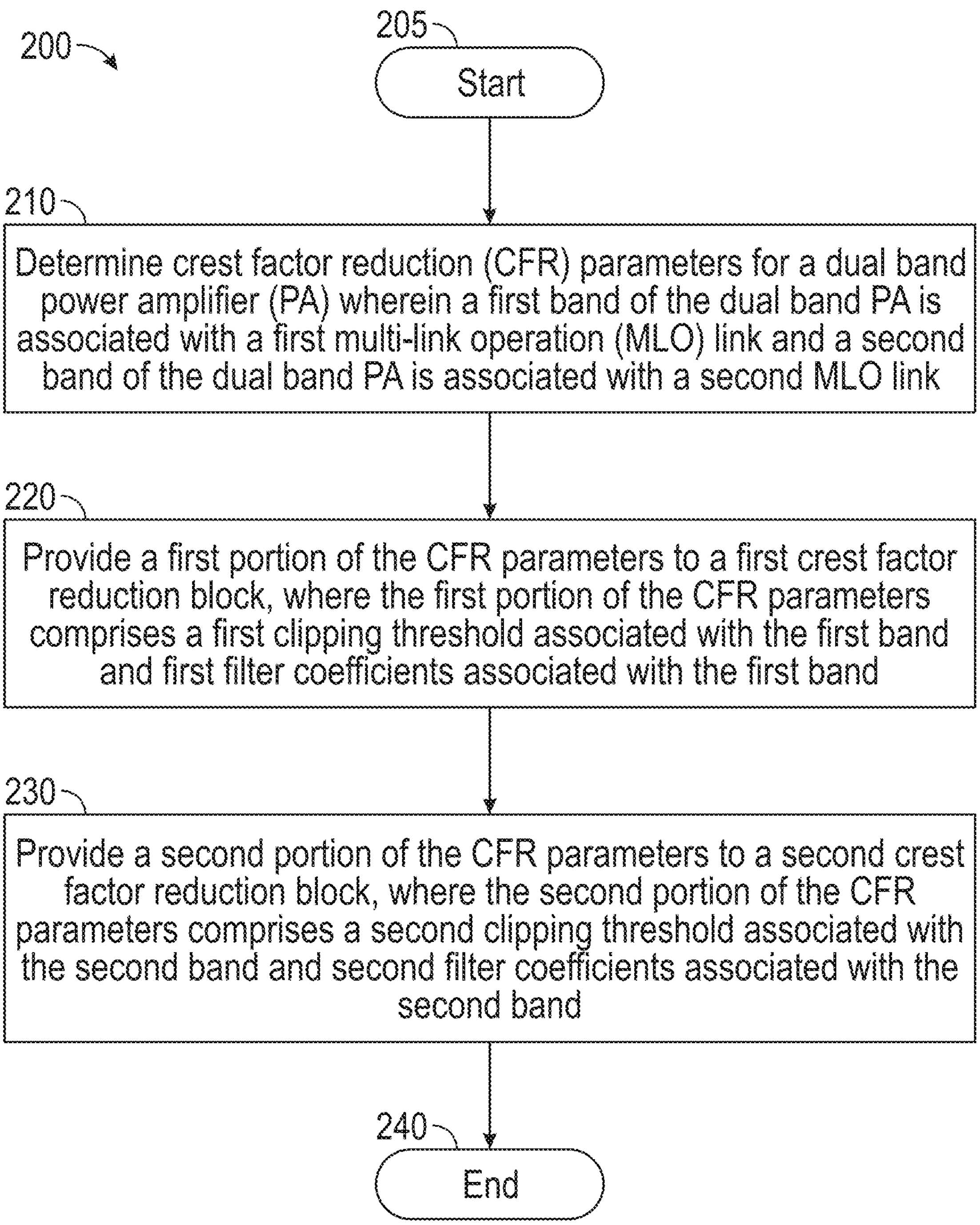
FIG. 2 is a flow chart of a method for providing a multi-band power amplifier for NSTR multi-link devices.

FIG. 2 is a flow chart setting forth the general stages involved in a method 200 consistent with embodiments of the disclosure providing a multi-band power amplifier for NSTR multi-link devices. Method 200 may be implemented using computing device 600 as described in more detail below with respect to FIG. 6. Ways to implement the stages of method 200 will be described in greater detail below.

Method 200 may begin at starting block 205 and proceed to stage 210 where computing device 600 may determine Crest Factor Reduction (CFR) parameters for a dual band PA. A first band of the dual band PA may be associated with a first Multi-Link Operation (MLO) link and a second band of the dual band PA is associated with a second MLO link. Determining the CFR parameters may comprise determining the CFR parameters based on a configuration of the first MLO link and the second MLO link.

Dual-Band Power Amplifiers

There may be two architectures of RF front-ends for the operation of a PA that may be classified as either concurrent or nonconcurrent. The former may indicate that a single PA may be amplifying multiple bands simultaneously, and the latter may indicate a set of single-band PAs may be operating in parallel with a combiner.

Figure 3:
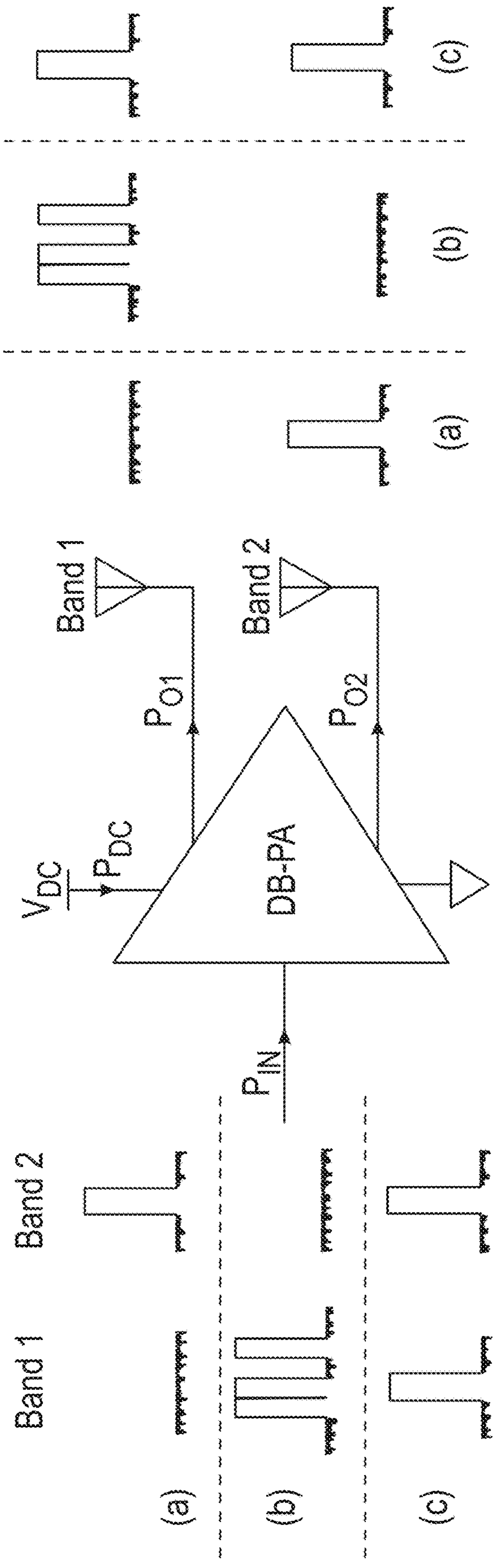
FIG. 3 is a block diagram of a dual-band, dual output Power amplifier (PA)

FIG. 3 is a block diagram of a dual-band, dual-output PA. Instead of using two separate amplifiers operating at two broadly separated frequencies, the composite input signal may be amplified by a single-transistor PA and delivered to two separate antennas. Three transmission scenarios may be supported: (a) nonconcurrent contiguous in a single band; (b) nonconcurrent noncontiguous in a single band; and (c) concurrent contiguous on two bands.

Multi-Link Devices in NSTR Operation

Figure 4:
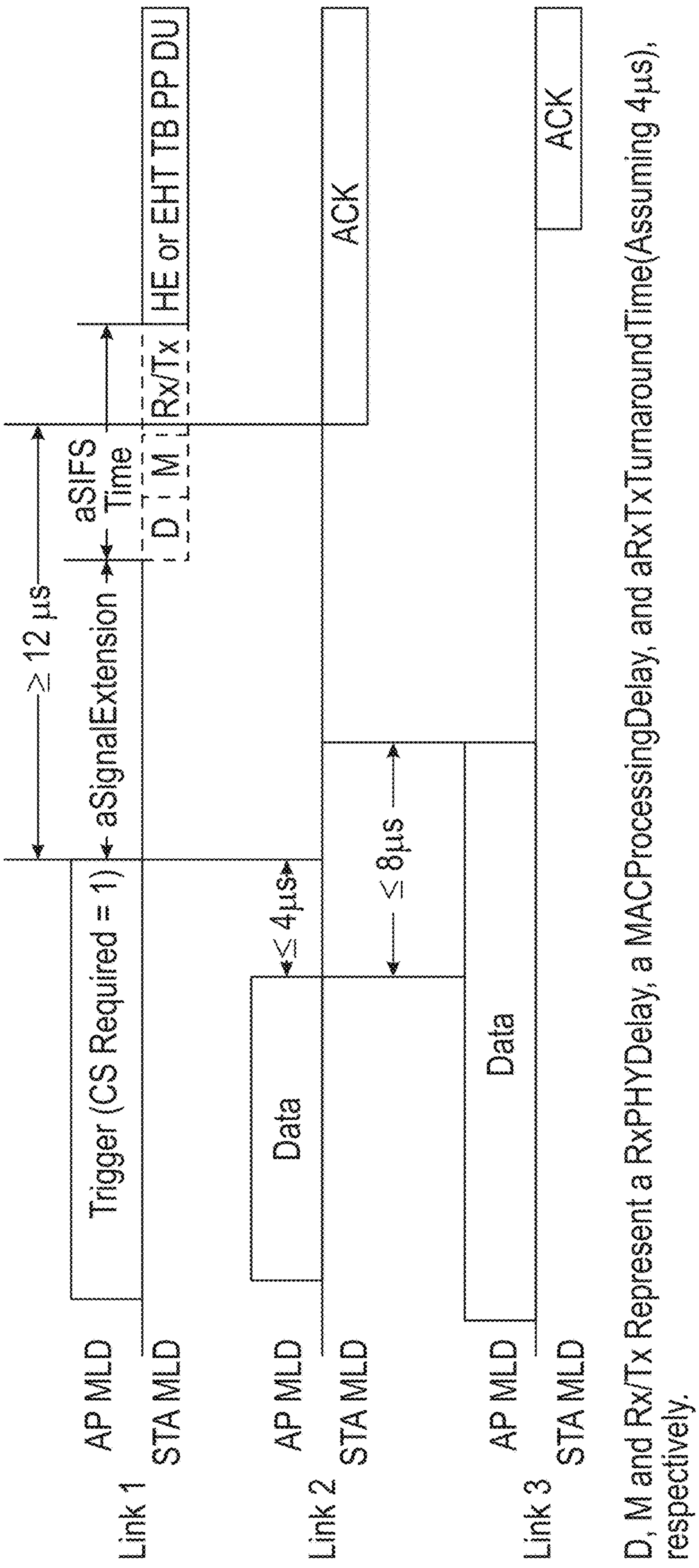
FIG. 4 shows an example Physical Layer Protocol Data Unit (PPDU) end time alignment timing relationship.

IEEE 802.11be has provided the ability to have Multi-Link Devices (MLDs), in which client devices and APs may do (concurrent or nonconcurrent) two or more wireless links for traffic. Non-Simultaneous Transmit and Receive (NSTR) operation may be when one radio is transmitting, another radio may not be able to receive due to leakage power from the transmitter impacting the receiver. However, NSTR supports simultaneous Transmit (Tx)+Tx and Receive (Rx)+Rx with time alignment. If an NSTR MLD that is receiving a Physical Layer Protocol Data Unit (PPDU) on a first link simultaneously transmits another PPDU on a second link, then the NSTR MLD may fail to receive the PPDU on the first link because of the interference caused by its transmission on the second link even though there may be a small time overlap between TX and RX. Therefore, the standard has specified a mechanism to align the end time of PPDUs that are simultaneously transmitted to the same NSTR non-AP MLD, which helps reduce the chances of the occurrence of such self-interference among Stations (STAs) affiliated to the same NSTR MLD. FIG. 4 shows an example of PPDU end time alignment timing relationships.

Embodiments of the disclosure may leverage the multi-band PA to support such transmission in NSTR mode with time alignment. This may reduce the cost and excessive heat (energy conservation) while providing a less complicated Tx-Rx isolation in the case of NSTR.

Radio Efficiency Optimization of MLD's Multi-Band PA

Figure 5:
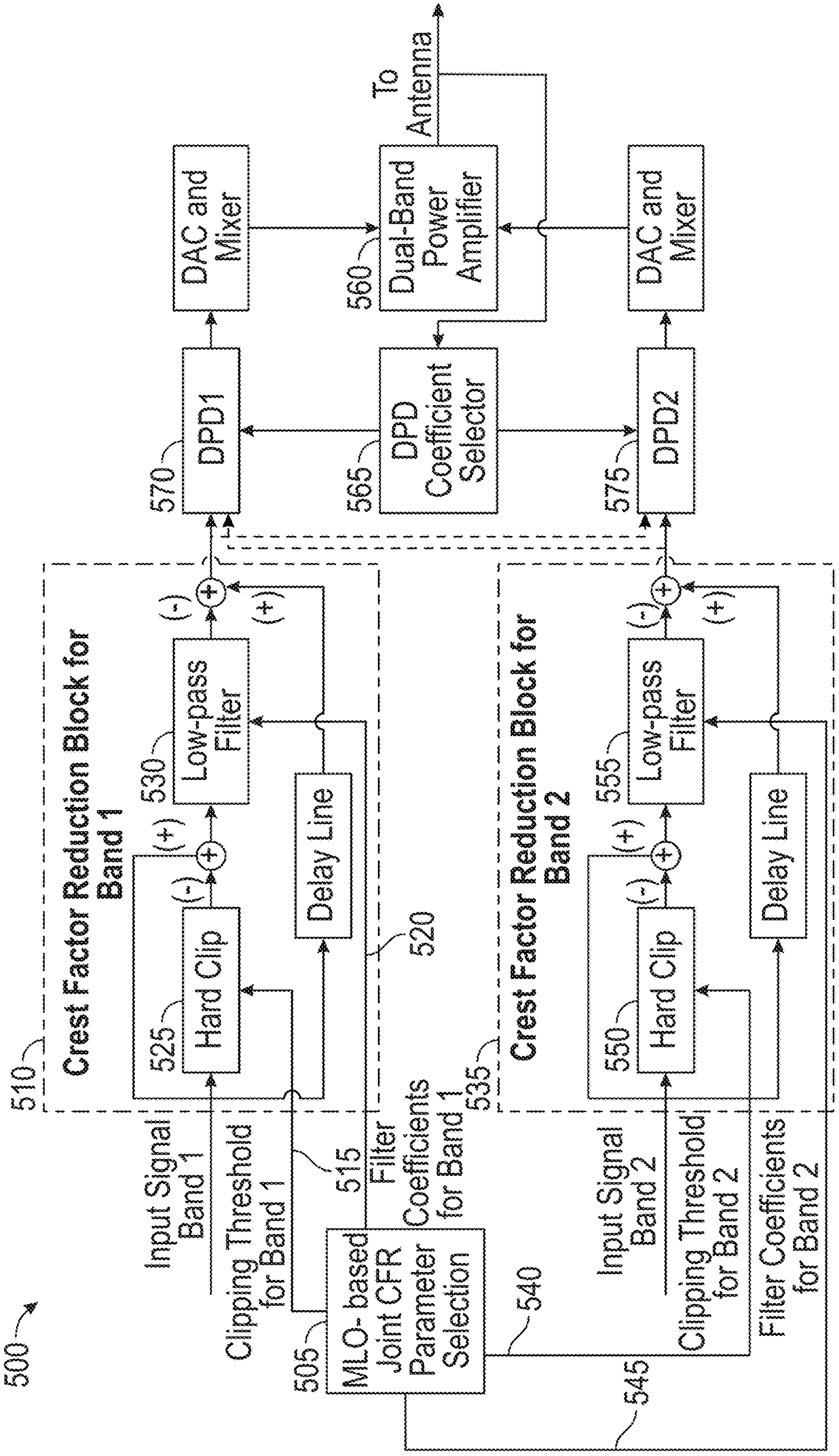
FIG. 5 is a block diagram of a system for providing joint Crest Factor Reduction (CFR) and Digital Pre-Distortion (DPD) parameter selection for Multi-Link Devices (MLSs) with a dual-band (PA)

For example, embodiments of the disclosure may leverage the multi-band PA capability for multi-link operation to improve the radio efficiency and also reduce the FEM complexity. FIG. 5 is a block diagram of a system to provide joint Crest Factor Reduction (CFR) and Digital Pre-Distortion (DPD) parameter selection for MLDs with a dual-band PA. The overall architecture of the NSTR MLD transmitter is shown in FIG. 5.

Joint CFR for Multi-Link Devices

Crest Factor Reduction (CFR) is a technique used to reduce the PAPR of transmitted signals so that a PA may operate more efficiently. Among CFR processes, clipping and filtering is a process used that has two steps of hard clipping and low-pass filtering. Clipping may cause sharp corners in a clipped signal, which leads to an unwanted out-of-band emission. To reduce the unwanted out-of-band emissions, the clipped signal may then go through a low-pass filter to reduce the high frequency signals that correspond to the sharp corners in the clipped signal.

For the clipping and filtering process, the main parameters may comprise a target PAPR (i.e., clipping threshold) and low-pass filter parameters, for example, maximum order, pass frequency, stop frequency, pass ripple, and stop ripple. When a dual-band power amplifier is fed from two separate Orthogonal Frequency-Division Multiplexing (OFDM)-based transmissions links in an MLD, the power of two links may be summed up and the total PAPR is the ratio of the maximum of the sum of two links' amplitude to the average of it. It may be written as:

$$PAPR[x(n)] = 10\log_{10}\frac{\max\left[(|x_1(n)| + |x_2(n)|)^2\right]}{E\left[(|x_1(n)| + |x_2(n)|)^2\right]}$$

Embodiments of the disclosure may adjust the CFR parameters in a way that it is optimal for both links. Dynamic thresholds selection process for NSTR MLDs may keep the transmission range in the linear portion of the PA while not degrading the Error Vector Magnitude (EVM). FIG. 5 is a block diagram of a system 500 for providing joint CFR and DPD parameter selection for MLSs with a dual-band PA. A CFR parameters selector 505 (e.g., running in computing device 600) may determine a set CFR parameters based on a configuration of the first MLO link (associated with the first band) and the second MLO link (associated with the second band). Determining the set CFR parameters based on the configuration may include, for example, determining the set CFR parameters based on link priority, based on bandwidth of link, based on link adaption requirements, or based on linearity in different bands as described in more detail below.

CFR Based on Link Priority

In power save usage of MLO, each non-AP STA affiliated with a non-AP MLD that is operating on an enabled link may maintain its own power state/mode. An AP of an AP MLD may transmit, on a link, a frame that carries an indication of buffered data for transmission on other enabled link(s). A non-AP MLD may monitor and performs basic operations (e.g., as traffic indication, Basic Service Set (BSS) parameter updates, etc.) on one or more link(s). Embodiments of the disclosure may consider stronger clipping on the control links when its EVM requirement is less than the main band that is being used. The smaller filter bandwidth may be selected for a control channel.

In a Time Sensitive Networking (TSN) application, MLO may decrease channel access delay by selecting the first available link in terms of latency, and enable isolation of time-sensitive traffic from other network traffic. In short, having two active links operating at different bands/channels between an AP and an STA may increase channel access efficiency by enabling opportunistic link selection, link aggregation, and multi-channel full duplex. The larger clipping threshold is considered for the link that is used for TSN. This may lower the probability of retransmission due to packet low Signal-to-Noise Ratio (SNR)/loss hence the less delay is expected.

CFR Based on Bandwidth of Link

The larger the bandwidth (more OFDM subcarrier) may increase the PAPR. Embodiments of the disclosure may increase the clipping threshold for the band with larger bandwidth to balance the nonlinearity in both links.

CFR Based on Link Adaption Requirements

When two links are having two different Modulation Coding Scheme (MCS), embodiments of the disclosure may keep the threshold higher for the link with higher MCS. This may help to guarantee good EVM and a high probability of correct decoding.

CFR Based on Linearity in Different Bands

The PA linearity region (i.e., dynamic range) may not be same for all bands. Embodiments of the disclosure may consider the thresholds based on this response to the linear region.

From stage 210, where computing device 600 may determine CFR parameters for the dual band PA, method 200 may advance to stage 220 where computing device 600 may provide a first portion of the CFR parameters to a first crest factor reduction block 510. The first portion of the CFR parameters may comprises a first clipping threshold 515 associated with the first band and first filter coefficients 520 associated with the first band. For example, first clipping threshold 515 may be provided to first hard clip 525 and first filter coefficients 520 may be provided to a first low pass filter 530. A signal associated with the first band (first MLO link) may be feed to first crest factor reduction block 510. The aforementioned clipping and filtering process may be performed on the signal associated with the first band by first crest factor reduction block 510.

Once computing device 600 provides the first portion of the CFR parameters to first crest factor reduction block 510 in stage 220, method 200 may continue to stage 230 where computing device 600 may provide a second portion of the CFR parameters to a second crest factor reduction block 535. The second portion of the CFR parameters may comprise a second clipping threshold 540 associated with the second band and second filter coefficients 545 associated with the second band. For example, second clipping threshold 540 may be provided to second hard clip 550 and second filter coefficients 545 may be provided to a second low pass filter 555. A signal associated with the second band (second MLO link) may be feed to second crest factor reduction block 535. The aforementioned clipping and filtering process may be performed on the signal associated with the second band by second crest factor reduction block 535. Once computing device 600 provide the second portion of the CFR parameters to second crest factor reduction block 535 in stage 230, method 200 may then end at stage 240.

DPD for MLD Multi-Band PAS

As described in greater detail below, embodiments of the disclosure may provide DPD to dual band PA 560. For example, a DPD coefficient selector 565 (e.g., running in computing device 600) may determine DPD coefficients. DPD coefficient selector 565 may then provide a first portion of the DPD coefficients to a first DPD circuit 570 configured to receive output of first crest factor reduction block 510. DPD coefficient selector 565 may also provide a second portion of the DPD coefficients to a second DPD circuit 575 configured to receive output of second crest factor reduction block 535.

The nonlinearity of PA 560 may generate spectral regrowth, which may lead to adjacent channel interference and violations of the out-of-band emissions standards mandated by regulatory bodies. It may also cause in-band distortion, which may degrade the EVM and data throughput of the communication system. DPD may be a cost-effective linearization techniques that comes after the PAPR reduction blocks.

With MLDs with multi-band PA, embodiments of the disclosure may have a combination of transmitted signals with different bandwidths and center frequencies. A two-dimensional (2D) DPD may be a solution because there may be no DPD that has a feedback Analog-to-Digital Converter (ADC) sampling rate that covers both links at the same time. In this case, each link's output may be nonlinear (e.g., polynomial) functions of both links (x1 and x2):

$$\boldsymbol{y}_1(n) = \sum_{m=0}^{M-1}\sum_{k=0}^{N}\sum_{j=0}^{k} c_{k,j,m}^{(1)} x_1(n-m) \times x_1(n-m)^{k-j} x_2(n-m)^j$$

$$\boldsymbol{y}_2(n) = \sum_{m=0}^{M-1}\sum_{k=0}^{N}\sum_{j=0}^{k} c_{k,j,m}^{(2)} x_2(n-m) \times x_2(n-m)^{k-j} x_1(n-m)^j$$

This architecture may require the correct training of memory polynomial coefficients, which in this case may be a three-dimensional (3D) array (instead of 2D in normal single Input/Output DPD).

With NSTR, even though no reception happens during the transmit time, a packet's start and end may not be completely aligned. The above description of FIG. 4 provides the start of PPDU alignment. Therefore, unlike cellular carrier aggregation, some part of the time one of the signals x1 and x2 are not present. This may jeopardize the DPD efficiency because the coefficient $c_{k,j,m}$ is designed based on the presence of the x2 in x1 and x1 in x2. It also may not be possible to change the coefficient during the transmission of PPDUs.

Start Time Aligned

When the start of packets are aligned, the PPDUs start at the same time, but the end time may have delays. With the join/2D DPD based on the above equation, the zero transmission on one link may remove the factors that inverse the nonlinearity coming from the same link. Therefore, three processes may reduce the impact of such misalignment at the end of PPDU: i) Constant Envelope; ii) Randomized; and ii) Replication. With constant envelope, the averaged power (or amplitude) of the signal may be saved from the link that is ending earlier. This may be replaced by zero value at the end of PPDU while one PPDU is still active. With randomized, a complex Gaussian sample may be generated and used with variance of averaged power of the signal from the link that is ending earlier. With replication, the current link quadrature (IQ) samples may be replicated and scaled by the averaged power of the other link.

The power scaling in the above three processes may come from the fact that the DPD coefficient are trained based on different power ranges and selected based on that total power. This is why the total power may be kept to be the same during the time that one link is absent.

End Time Aligned

When an AP is sending back the Acknowledgements (ACKs), the standard may require end of PPDU alignment while the start may have delays. In this case, the PPDU of both links may not be ready when the earlier starts transmitting. In this case, the three aforementioned processes (constant, randomized and replicated) may be followed with the same averaged power as the link that started earlier.

Figure 6:
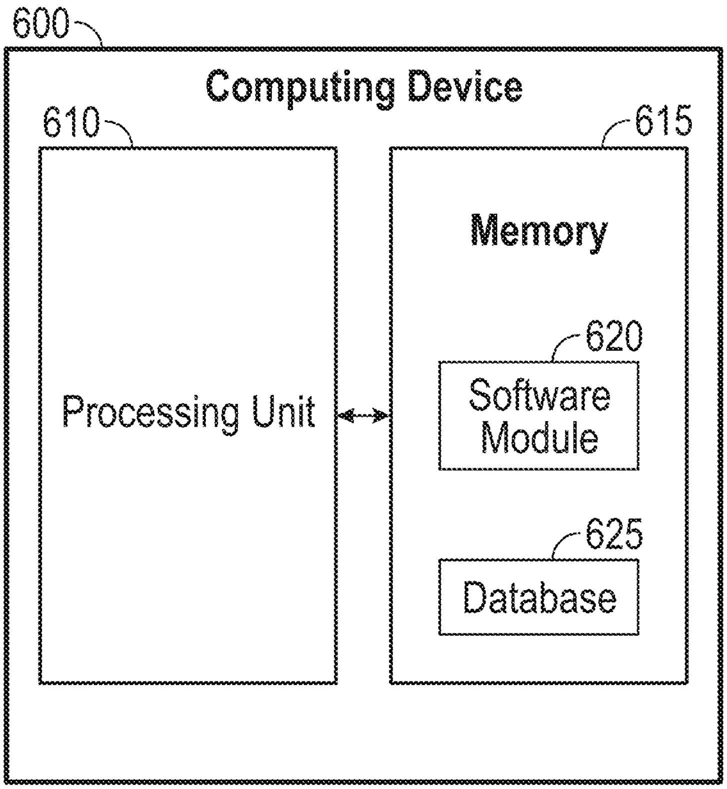
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for providing a multi-band power amplifier for NSTR multi-link devices as described above with respect to FIG. 2. Computing device 600, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples, and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

determining, by a computing device, Crest Factor Reduction (CFR) parameters for a dual band Power Amplifier (PA) wherein a first band of the dual band PA is associated with a first Multi-Link Operation (MLO) link and a second band of the dual band PA is associated with a second MLO link;

providing a first portion of the CFR parameters to a first crest factor reduction block, where the first portion of the CFR parameters comprises a first clipping threshold associated with the first band and first filter coefficients associated with the first band; and providing a second portion of the CFR parameters to a second crest factor reduction block, where the second portion of the CFR parameters comprises a second clipping threshold associated with the second band and second filter coefficients associated with the second band.

2. A system comprising:

a memory storage; and a processing unit coupled to the memory storage, wherein the processing unit is operative to:

determine Crest Factor Reduction (CFR) parameters for a dual band Power Amplifier (PA) wherein a first band of the dual band PA is associated with a first Multi-Link Operation (MLO) link and a second band of the dual band PA is associated with a second MLO link;

provide a first portion of the CFR parameters to a first crest factor reduction block, where the first portion of the CFR parameters comprises a first clipping threshold associated with the first band and first filter coefficients associated with the first band; and provide a second portion of the CFR parameters to a second crest factor reduction block, where the second portion of the CFR parameters comprises a second clipping threshold associated with the second band and second filter coefficients associated with the second band.

3. A non-transitory computer-readable medium that stores a set of instructions which when executed perform a method executed by the set of instructions comprising:

determining, by a computing device, Crest Factor Reduction (CFR) parameters for a dual band Power Amplifier (PA) wherein a first band of the dual band PA is associated with a first Multi-Link Operation (MLO) link and a second band of the dual band PA is associated with a second MLO link;

providing a first portion of the CFR parameters to a first crest factor reduction block, where the first portion of the CFR parameters comprises a first clipping threshold associated with the first band and first filter coefficients associated with the first band; and providing a second portion of the CFR parameters to a second crest factor reduction block, where the second portion of the CFR parameters comprises a second clipping threshold associated with the second band and second filter coefficients associated with the second band.

* * * * *